US008538788B1

(12) United States Patent
Spiegel et al.

(10) Patent No.: US 8,538,788 B1
(45) Date of Patent: Sep. 17, 2013

(54) SYSTEM FOR WORK ORDER REFINEMENT PRIOR TO ACCEPTANCE AND METHODS THEREOF

(75) Inventors: Dana Spiegel, Brooklyn, NY (US); Gabe Miano, Boston, MA (US); Lauren Macleod, Rye, NY (US); Paul Nadjarian, New York, NY (US); Jose Bernal, Andover, MA (US); Chris Cheng, New York, NY (US); Kate Grinney, New York, NY (US)

(73) Assignee: Onforce, Inc., Lexington, MA (US)

( * ) Notice: Subject to any disclaimer, the term of this patent is extended or adjusted under 35 U.S.C. 154(b) by 560 days.

(21) Appl. No.: 12/078,656

(22) Filed: Apr. 2, 2008

(51) Int. Cl.
*G06Q 10/06* (2012.01)

(52) U.S. Cl.
USPC ....... 705/7.11; 705/7.12; 705/7.13; 705/7.14; 705/7.15; 705/7.16; 705/7.17; 705/7.25

(58) Field of Classification Search
USPC ............ 705/7, 8, 37, 40, 7.11–7.42, 300–301
See application file for complete search history.

(56) References Cited

U.S. PATENT DOCUMENTS

| | | |
|---|---|---|
| 4,630,201 A | 12/1986 | White |
| 4,846,501 A | 7/1989 | Del Grande |
| 4,858,143 A | 8/1989 | Fournier |
| 5,220,501 A | 6/1993 | Lawlor et al. |
| 5,283,829 A | 2/1994 | Anderson |
| 5,383,113 A | 1/1995 | Kight et al. |
| 5,465,206 A | 11/1995 | Hilt et al. |
| 5,787,000 A | 7/1998 | Lilly et al. |
| 5,799,284 A | 8/1998 | Bourquin |
| 5,864,483 A | 1/1999 | Brichta |
| 5,940,807 A | 8/1999 | Purcell |
| 5,983,200 A | 11/1999 | Slotznick |
| 6,003,078 A | 12/1999 | Kodimer et al. |
| 6,006,199 A | 12/1999 | Berlin et al. |
| 6,012,045 A * | 1/2000 | Barzilai et al. ................. 705/37 |
| 6,041,312 A | 3/2000 | Bickerton et al. |

(Continued)

FOREIGN PATENT DOCUMENTS

| | | |
|---|---|---|
| EP | 0261816 A2 | 3/1988 |
| WO | WO-0057299 | 9/2000 |
| WO | WO-2004097575 A2 | 11/2004 |
| WO | WO-2004097580 A2 | 11/2004 |

OTHER PUBLICATIONS

PayPal (www.paypal.com) citing http://computer.howstuffworks.com/pavpal (13 pages) from the attached Examiner's Report submitted to the Australian Patent Office in related Australian application No. 2004235043 (dated Jul. 3, 2009).

(Continued)

*Primary Examiner* — Elda Milef
(74) *Attorney, Agent, or Firm* — Balnk Rome LLP

(57) ABSTRACT

A system and method for managing requests for services, in particular via the use of the Internet, where requests for service may be refined before they are accepted. In response to the receipt of a service request from a service requester, a work order is created and routed to one or more of the service providers for the purpose of having one or more of the selected service providers indicate an acceptance of the work order. This work order can be later refined, for example if changes need to be made, especially in response to queries from the service providers.

18 Claims, 8 Drawing Sheets

(56) References Cited

U.S. PATENT DOCUMENTS

| | | |
|---|---|---|
| 6,044,362 A | 3/2000 | Neely |
| 6,088,626 A | 7/2000 | Lilly et al. |
| 6,095,477 A | 8/2000 | Pohlman |
| 6,343,738 B1 | 2/2002 | Ogilvie |
| 6,360,211 B1 | 3/2002 | Anderson et al. |
| 6,381,587 B1 | 4/2002 | Guzelsu |
| 6,397,197 B1 | 5/2002 | Gindlesperger |
| 6,466,914 B2 | 10/2002 | Mitsuoka et al. |
| 6,505,164 B1 | 1/2003 | Brunsting et al. |
| 6,594,647 B1 | 7/2003 | Randle et al. |
| 6,633,900 B1 | 10/2003 | Khalessi et al. |
| 6,684,191 B1 | 1/2004 | Barnard et al. |
| 6,687,677 B1 | 2/2004 | Barnard et al. |
| 6,714,915 B1 | 3/2004 | Barnard et al. |
| 6,738,746 B1 | 5/2004 | Barnard et al. |
| 6,754,605 B1 | 6/2004 | Pate et al. |
| 7,092,913 B2 | 8/2006 | Cannon, Jr. |
| 7,096,193 B1 | 8/2006 | Beaudoin et al. |
| 7,213,064 B2 | 5/2007 | Smith et al. |
| 2001/0034660 A1 | 10/2001 | Heumann |
| 2001/0056389 A1 | 12/2001 | Fair et al. |
| 2002/0010615 A1 | 1/2002 | Jacobs |
| 2002/0019757 A1 | 2/2002 | Dodt et al. |
| 2002/0026407 A1 | 2/2002 | Neubert |
| 2002/0038233 A1* | 3/2002 | Shubov et al. .................... 705/8 |
| 2002/0040352 A1 | 4/2002 | McCormick |
| 2002/0069079 A1 | 6/2002 | Vega |
| 2002/0087680 A1 | 7/2002 | Cerami et al. |
| 2002/0103731 A1 | 8/2002 | Barnard et al. |
| 2002/0111842 A1 | 8/2002 | Miles |
| 2002/0120846 A1 | 8/2002 | Stewart et al. |
| 2002/0153134 A1 | 10/2002 | Newman |
| 2002/0156732 A1* | 10/2002 | Odijk et al. .................... 705/40 |
| 2002/0174033 A1 | 11/2002 | Lin |
| 2002/0184147 A1 | 12/2002 | Boulger |
| 2002/0194112 A1 | 12/2002 | dePinto et al. |
| 2003/0040990 A1 | 2/2003 | Lee et al. |
| 2003/0069797 A1 | 4/2003 | Harrison |
| 2003/0115126 A1 | 6/2003 | Pitroda |
| 2003/0126057 A1 | 7/2003 | Gross et al. |
| 2003/0130820 A1 | 7/2003 | Lane |
| 2003/0149645 A1 | 8/2003 | Flynn et al. |
| 2003/0154118 A1 | 8/2003 | Druyan et al. |
| 2003/0182206 A1 | 9/2003 | Hendrix et al. |
| 2003/0212617 A1 | 11/2003 | Stone et al. |
| 2004/0014479 A1 | 1/2004 | Milnnan |
| 2004/0073503 A1 | 4/2004 | Morales et al. |
| 2004/0117154 A1 | 6/2004 | Lane et al. |
| 2004/0117155 A1 | 6/2004 | Lane et al. |
| 2004/0199466 A1 | 10/2004 | Chi |
| 2005/0015501 A1 | 1/2005 | Kaplan et al. |
| 2005/0048433 A1 | 3/2005 | Hilliard |
| 2005/0159968 A1* | 7/2005 | Cozzolino ........................ 705/1 |
| 2005/0244768 A1 | 11/2005 | Taub et al. |
| 2005/0260534 A1 | 11/2005 | Belfor et al. |
| 2006/0235826 A1* | 10/2006 | Lance ................. 707/1 |
| 2009/0030827 A1* | 1/2009 | Burdess et al. .................. 705/37 |

OTHER PUBLICATIONS

Investorwords.com, Electronic Funds Transfer Definition, available at http://www.investorwords.com/1680/Electronic_Funds_Transfer.html, accessed Mar. 12, 2009.

Electronic Fund Transfer Act, 15 U.S.C. § 1693(a) (2006) available at <http://frwebgate.access.gpo.gov/cgi-bin/usc.cgi?ACTION-RETRIEVE&FILE-$$xa$$busc15.wais&start=8592872&SIZE=6054&TYPE=TEXT>, accessed Mar. 12, 2009.

\* cited by examiner

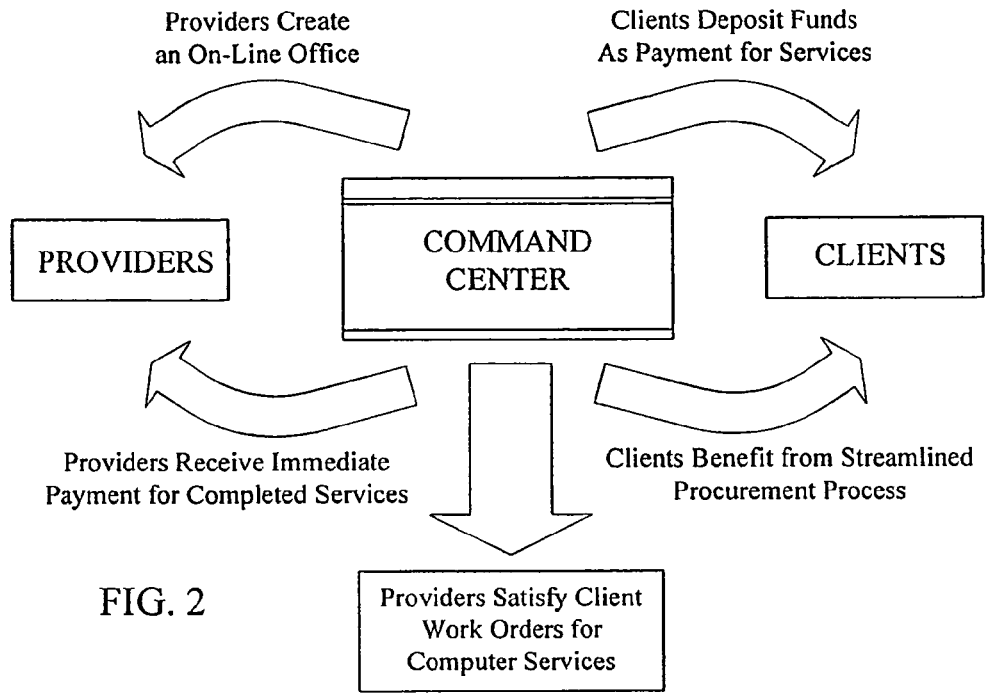
FIG. 2
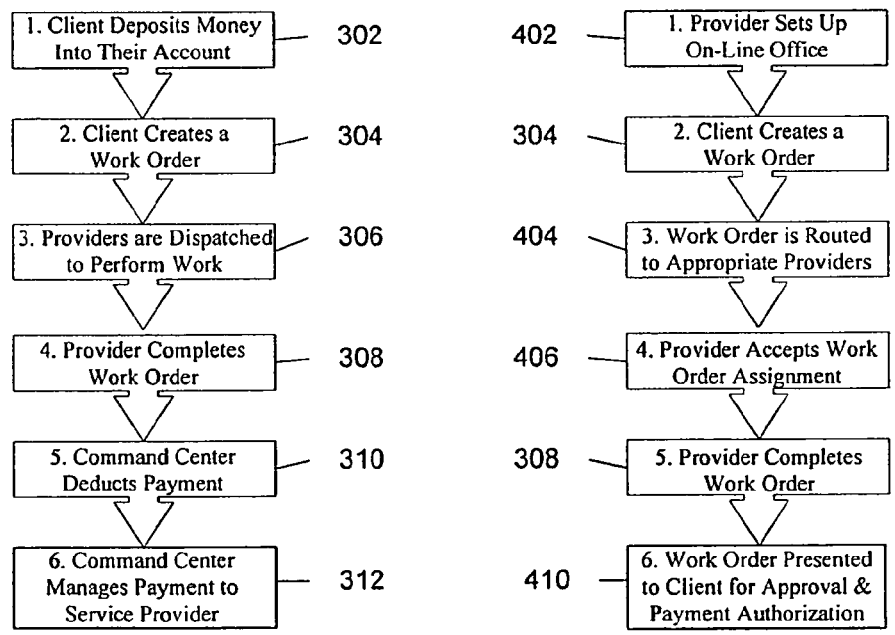
FIG. 3
FIG. 4

SYSTEM FOR WORK ORDER REFINEMENT PRIOR TO ACCEPTANCE AND METHODS THEREOF

FIELD OF THE INVENTION

The subject invention relates generally to a system and method for managing requests for services. More specifically, the present invention is directed to a system that allows for refinement of requests for services, to enhance the overall process.

DESCRIPTION OF RELATED ART

A need presently exists for an improved system and method for requesting, deploying, managing, and delivering services. This need is especially felt by relatively medium to larger sized companies with multiple geographic locations and complex multi-vendor environments and also by smaller companies. Employing full-time, on-site service personnel at many such locations is generally not feasible given the associated costs. As such, to have their service needs fulfilled, such as, for example, computer services, these smaller branch offices must rely on support from a centralized source, engage local companies/consultants, and/or contract with a service firm that are alleged to have national coverage.

In the areas of information technology, in instances where a branch office relies on assistance from a corporate help desk to address their computer service needs, technology is presently available that allows a service provider to remotely access a computer for the purpose of attempting to solve certain problems that may exist. However, not all problems are capable of being solved in this manner, e.g., problems associated with computers that are not capable of being turned on, printers that are jammed, cables that are broken, etc. Thus, to meet branch office demands for computer services arising from problems that cannot be serviced via the use of remote access software, the only alternative left for a centralized help desk is to request that the equipment experiencing the problem be sent out for repair or to send a technician to the branch office to solve the problem. Undesirably, performing repair services in this manner is inefficient and costly, especially when the service request results from a problem that is relatively minor. Furthermore, there exists a cost that is associated with the time of lost access to the equipment in that employees at the branch office may not be capable of performing their required work without the operable equipment.

When branch or remote offices are authorized to engage local companies for the purpose of addressing their computer service needs, other problems tend to arise. In this regard, problems may be created for the help desk as they attempt to manage the arrangement of services throughout the entirety of a company at all of the different locations. Further problems arise from the need to budget and manage the costs associated with requesting services in this manner. By way of example, if a company has three hundred locations, that may equate to three hundred computer service vendors, with three hundred different prices for parts and hourly service rates, with three hundred different response times, etc. Thus, for companies having multiple geographic locations and complex multi-vendor computer environments, the problems associated with contracting service professionals, e.g., coordinating accounting, paying large quantities of small invoices, etc., can become very burdensome.

To address some of these problems, a company can contract with a large service provider company, for example, IBM, EDS or CSC. However, while large service providers can deploy services that are generally consistent around the country and the contracting company would have only one vendor with one price for parts and labor, these contracts are usually limited in scope and extremely costly. In this regard, service contracts usually cover only hardware and act like extended warranties. Thus, if a company requests services in an area that falls into a category not covered under contract, the hourly rates can become exorbitantly high. In addition, the most comprehensive on-site contracts still leave open ends for equipment covered under warranty, software problems, new system roll-outs and other upgrades. Still further, large service providers often utilize the services of sub-contractors which makes it increasingly difficult if not impossible for service requestors to track the progress of service requests. To further complicate matters, large service providers often try to protect or mask their use of sub-contractors so as to give the appearance of providing a comprehensive service solution.

One such system that addresses the concerns is the system and methods discussed in U.S. application Ser. No. 10/755,569, "System and Method for Managing Accounts Payable and Accounts Receivable," filed Jan. 12, 2004, assigned to the assignee of the present application. This application is incorporated by reference herein. The system and method allows for management of service requests, including controlling, building, and deploying a scalable workforce to solve service related problems quickly and efficiently. The subject system and method allow any business to create and manage a service department, with the creation and management of the service department performed via the Internet. The subject system is also used by a service requestor to monitor and pay for services. While this system overcomes the problems noted above, it does not explicitly address many of the issues involved with such systems.

One such issue occurs when a client prepares and submits a work order and the potential providers have questions about the work order. The above discussed system does not explicitly provide a mechanism that allows providers to ask questions to the client before a work order is accepted. The questions may relate to clarification of the scope of the work order or specifics about the work order. These questions and the client's answers should be visible to the client and all routed providers. Upon acceptance of the work order, the client should be held accountable for the answers provided, so that misunderstandings can be minimized. All information provided in a buyer's answers should be considered as binding additions to the work order terms and conditions.

Thus, there is a need for a system that allows clients and service providers to interact electronically to fulfill work orders, where changes can be made to the work orders and the changes can be incorporated into the work order process. There is also a need for methods that will allow for refinement of work orders that do not hamper the process of fulfilling those work orders and allow all parties to fully understand all terms redefined.

SUMMARY OF THE INVENTION

It is therefore an object of the invention to allow clients and service providers to interact electronically to fulfill work orders, where changes can be made to the work orders and the changes can be incorporated into the work order process. Another object of the invention is to provide methods that will allow for refinement of work orders that do not hamper the process of fulfilling those work orders and allow all parties to fully understand all terms redefined.

To achieve the above and other objects, the present invention is directed to a system that allows for refinement of requests for services before those requests for service have been accepted. The present invention overcomes the disadvantages of the prior art systems discussed above.

According to at least one embodiment, the invention is directed to a computer readable-medium for use in connection with a processing system having instructions for managing service requests. The instructions cause a work order to be created from a request for services received from a service requestor and route the work order to at least one service provider selected from a registry of service providers. Thereafter, the instructions facilitate preparation of a clarifying question, based on the work order, by the at least one service provider and the forwarding of the clarifying question to the service requestor. The instructions also cause a response to the clarifying question to be routed from the service requestor to the at least one service provider and provides for monitoring for acceptance of the work order by the at least one service provider.

In specific embodiments, multiple clarifying questions may be sent to the service requestor. Also, the at least one service provider may include multiple service providers and the instructions further cause the forwarding of the clarifying question and the response to the clarifying question to other service providers of the multiple service providers other than the service provider that provided the clarifying question. The instructions may require the comparison of a number of clarifying questions already posed with a predetermined maximum number of clarifying questions and the prevention of the preparation of additional clarifying questions when the number of clarifying questions already posed is equal to the predetermined maximum number of clarifying questions. The instructions may require the comparison of a number of characters typed in the preparation of the clarifying question with a predetermined maximum number of characters and the prevention of entry of additional characters when the number of characters typed is equal to the predetermined maximum number of characters.

In addition, the instructions for routing the work order to one or more service providers selected from the registry may be made via a network connection with the processing system, via a facsimile machine or via a telephone. The one or more service providers may be selected from the registry by comparing capabilities of the service providers and information contained in the service request. The instructions may further include accepting feedback from the service requestor to establish a rating for the one or more of the selected service providers that were assigned the work order.

According to at least another embodiment, a method for managing service requests is disclosed. The method includes the steps of creating a work order from a request for services received from a service requestor, routing the work order to at least one service provider selected from a registry of service providers, facilitating preparation of a clarifying question, based on the work order, by the at least one service provider, forwarding the clarifying question to the service requestor, routing a response to the clarifying question, from the service requestor, to the at least one service provider and monitoring for acceptance of the work order by the at least one service provider.

BRIEF DESCRIPTION OF THE DRAWINGS

A preferred embodiment of the present invention will be set forth in detail with reference to the drawings, in which:

FIG. 2 illustrates a process flow diagram of an exemplary method for managing service requests, according to one aspect of the present invention;

FIG. 3 illustrates a further process flow diagram of the exemplary method for managing service requests with a particular focus on the service requestor, according to one aspect of the present invention;

FIG. 4 illustrates a further process flow diagram of the exemplary method for managing service requests with a particular focus on the service provider, according to one aspect of the present invention;

FIG. 9 illustrates screen-shot of a provider routed work order table, according to one embodiment of the present invention;

DETAILED DESCRIPTION OF THE INVENTION

Figure 1:
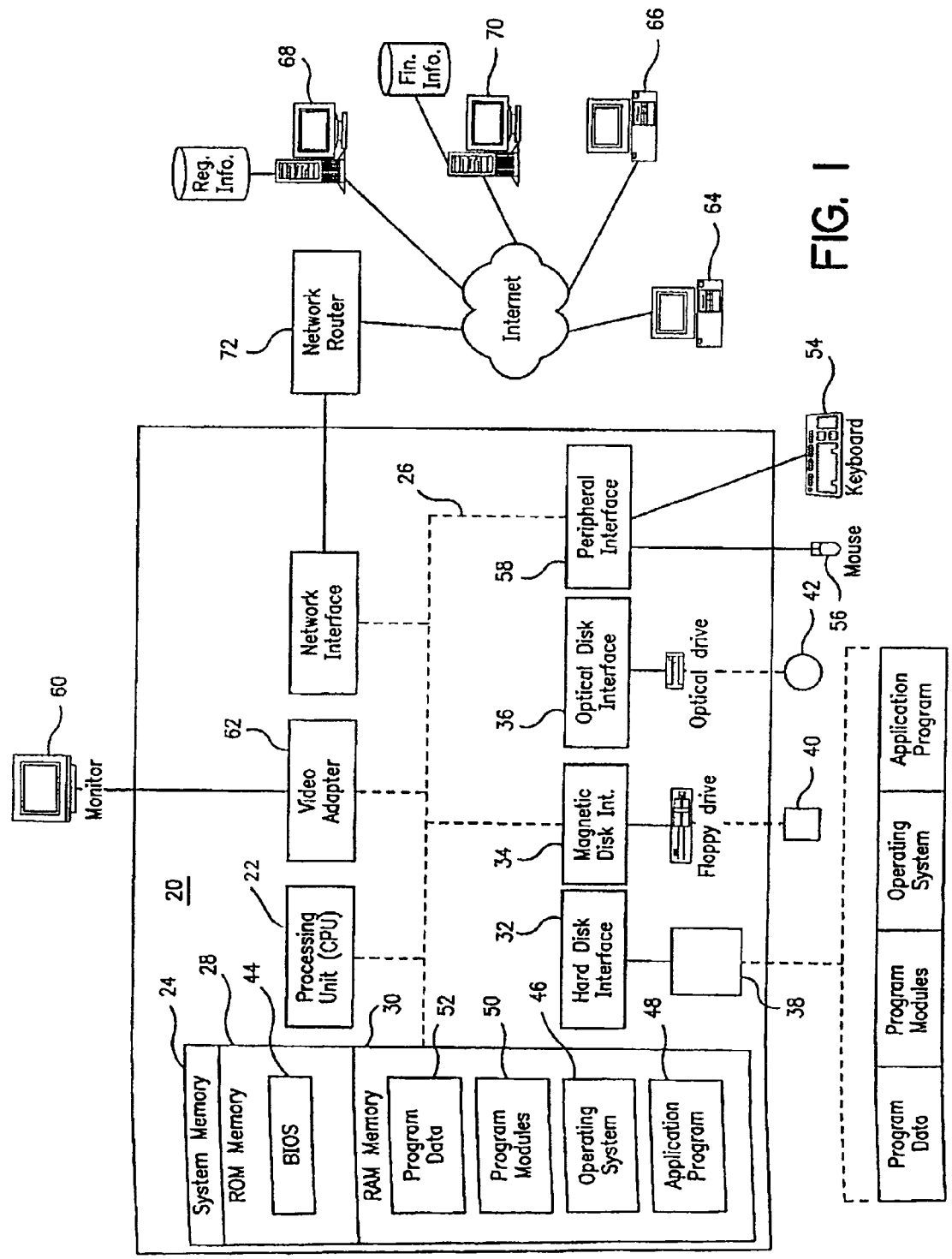
FIG. 1 illustrates a block diagram of an exemplary computer system in which the principles of the subject invention may be employed.

The present invention will be set forth in detail with reference to the drawings, in which like reference numerals refer to like elements or operational steps throughout. The following descriptions provide examples of how to implement the present invention, but are not the only implementations possible. The examples that are described herein have been chosen for their illustrative power in explaining at least one aspect of the present invention and have been shown to have utility in carrying out the objectives of the present invention.

Although not required, the system and method will be described in the general context of computer executable instructions being executed by one or more processing devices such as a personal computer, mainframe computer, personal-digital assistant ("PDA"), cellular telephone, or the like. Generally, the computer executable instructions reside in program modules which may include routines, programs, objects, components, data structures, etc. that perform particular tasks or implement particular abstract data types. In this regard, those skilled in the art will appreciate that the system and method described hereinafter may also be practiced in distributed computing environments where tasks are performed by various processing devices that are linked through a communication network and where program modules may be located in both local and remote memory storage devices associated with such processing devices.

A network system in which the subject system and method may reside is illustrated by way of example in FIG. 1. In the illustrated network system, a Command Center 20, illustrated in the exemplary form of a computer system, is provided to manage service requests in a manner that will be described in greater detail hereinafter. While described and illustrated as a single computer system, it is again emphasized that the Command Center 20 may be implemented such that tasks are performed by various processing devices that are linked through a communication network such as the Internet, LAN, or the like.

For performing the various tasks, the Command Center 20 preferably includes a processing unit 22 and a system memory 24 which may be linked via a bus 26. Without limitation, the bus 26 may be a memory bus, a peripheral bus, and/or a local bus using any of a variety of bus architectures. By way of further example, the bus 26 may include an architecture having a North Bridge and a South Bridge where the North Bridge acts as the connection point for the processing unit 22, memory 24, and the South Bridge. The North Bridge functions to route traffic from these interfaces, and arbitrates and controls access to the memory subsystem from the processing unit 22 and I/O devices. The South Bridge, in its simplest form, integrates various I/O controllers, provides interfaces to peripheral devices and buses, and transfers data to/from the North Bridge through either a PCI bus connection in older designs, or a proprietary interconnect in newer chipsets.

As needed for any particular purpose, the system memory 24 may include read only memory (ROM) 28 and/or random access memory (RAM) 30. Additional memory devices may also be made accessible to the Command Center 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer readable instructions, data structures, program modules and other data for the Command Center 20. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nonodrives, memory sticks, and other read/write and/or read-only memories.

A number of program modules may be stored in one or more of the memory/media devices. For example, a basic input/output system (BIOS) 44, containing the basic routines that help to transfer information between elements within the Command Center 20, such as during start-up, may be stored in ROM 24. Similarly, the RAM 30 and/or the hard drive 38 may be used to store computer executable instructions comprising an operating system 46, one or more applications programs 48, other program modules 50, and/or program data 52.

A user may enter commands and information into the Command Center 20 through input devices such as a keyboard 54 and/or a pointing device 56. While not illustrated, other input devices may include a microphone, a joystick, a game pad, a scanner, a touch screen, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the Command Center 20, a monitor 60 or other type of display device may also be connected to the bus 26 via an interface, such as video adapter 62. In addition to the monitor 60, the Command Center 20 may also include other peripheral output devices, not shown, such as speakers and printers.

For operating in a networked environment, such as the Internet, the Command Center 20 utilizes logical connections to one or more remote processing devices, such as client computer 64, technician computer 66, database computer 68, and/or financial institution computer 70. In this regard, while the remote processing devices have been illustrated in the exemplary form of computers, it will be appreciated that the remote processing devices may be any type of device having processing capabilities and/or the ability to establish a communication link with the Command Center 20 such as, for example, a cellular telephone.

Again, the illustrated processing devices need not be implemented as a single device but may be implemented in a manner such that the tasks performed by the various processing devices are distributed to a plurality of processing devices linked through a communication network. Thus, the remote processing devices may include many or all of the elements described above relative to the Command Center 20 including the memory storage devices and a display device. The connection between the Command Center 20 and the remote processing devices is typically made through a further processing device 72 that is responsible for network routing. Furthermore, within such a networked environment, it will be appreciated that program modules depicted relative to the Command Center 20, or portions thereof, may be stored in the memory storage devices of the remote devices. It will also be understood that interface devices may also be used to establish links with devices lacking processing power, for example, an interactive voice response ("IVR") system may be used to allow a conventional telephone to be interfaced with the Command Center 20.

To manage service requests, acts and symbolic representations of operations will be performed by the processing devices illustrated in FIG. 1. As such, it will be understood that such acts and operations, which are at times referred to as being computer-executed, include the manipulation by the processing devices of electrical signals representing data in a structured form. This manipulation transforms the data or maintains it at locations in the memory system, which reconfigures or otherwise alters the operation of the processing devices 20, 64, 66, 68, and 70 in a manner well understood by those of skill in the art of computer systems. The data structures where data is maintained are physical locations of the memory that have particular properties defined by the format of the data. Nevertheless, while described in the foregoing context, this description is not meant to be limiting as those skilled in the art will further appreciate that various acts and operations described herein may also be implemented in hardware.

By way of further example, the subject system and method may be implemented using a tiered architecture where one tier includes a front-end database and Web applications running on Web server(s) that constitute an interface between users and the back-end of the system. In this manner, authorized users may access the system through a Web browser having a graphical user interface, for example, provided by a Java applet or as a common HTML page. To secure the system, the Web application may be surrounded by a firewall. The application logic would then constitute a further tier and may reside on a cluster of application servers including all of the capabilities necessary to support multiple transactions simultaneously.

For use in controlling, building, and deploying a scalable workforce to solve service related problems, the Command Center 20 is used to provide an essentially automated system to link service requesters, e.g., corporate help-desk managers, with service providers, e.g., computer repair technicians. To that end, the Command Center 20 operates to provide a networked supply chain management system by which a service requestor may choose, for example via the Internet, one or more service providers, monitor the work performed by the service provider, and remit payment to the service provider(s) as generally illustrated in FIG. 2. It is also contemplated that the operator of the Command Center 20 would receive a fee on each transaction from one or both of the service provider (e.g., a percentage of invoice amount) and the service requestor (e.g., a flat fee). It is further contemplated that the operator of the Command Center 20 may provide fee services to companies whereby the operator of the Command Center 20 essentially functions as a centralized help desk and arranges for service providers to meet the needs of service requesters.

For a service requestor to become a system client, the service requestor preferably registers with the system, for example, by accessing a Web site maintained by the Command Center 20 using client computer 64 and by providing information requested by the Command Center 20. This information may include, but need not be limited to, preferred fees, geographic locations, preferred service providers, preferred hours of availability, preferred certifications, identification of employees that are authorized access, etc. As generally illustrated in FIG. 3, the operator of the Command Center 20 may also require service requester clients to deposits funds 302 into an account accessible by the Command Center 20 for reasons that are described in further detail hereinafter. Management of deposit account funds may be performed directly by the Command Center 20 or the Command Center 20 may interact with one or more financial institution computers 70 for this same purpose as described, for example, in U.S. patent application Ser. No. 10/692,181, entitled "System And Method For Managing Accounts Payable," commonly assigned herewith, which is hereby incorporated by reference in its entirety. Among other things, the registration of the service requestor as a client of the system addresses a need for companies to have a single point of contact and solves the problem of payments to, and management of, multiple vendors. Registration information may be stored and accessed by the Command Center 20 directly or by means of cooperation with a database server computer 68.

Once a service requestor client has registered with the system, service requestor clients will be able to link to the Command Center 20 to perform tasks such as, for example, updating and/or changing registration information, forming a web page, generating a service request, precisely identifying service personnel that the service requestor client desires to meet their service request, managing and following up on service requests, paying the service providers (e.g., requesting a withdraw against their deposit), negotiating service contracts, and/or providing feedback on each service provider. In this regard, service requestor clients may access the Command Center 20 by means of the Internet, e.g., by accessing a Web site page maintained by the Command Center 20, and/or through the use of APIs that function to directly interface client computer 64 with the Command Center 20.

For a service provider to become a client of the system, as illustrated in FIG. 4, the service provider also preferably registers with the system, for example, by accessing a Web site maintained by the Command Center 20 using technician computer 66 and by providing information requested by the Command Center 20. In this regard, the service provider may be requested to provide information to create an account with the Command Center 20 as well as information that will become available via an on-line office 402 to potential service requestors. To these ends, the Command Center 20 may collect information concerning a client service provider company and/or information concerning individual employees of the client service provider. Thus, information collected during the registration process may include contact information for the company and/or individuals, employee skill sets, geographical locations for service areas, availability times, rates, response times, certifications, languages spoken, etc.

As noted, once such registration information has been collected, a service provider client will have the equivalent of an on-line office with the Command Center 20 which is accessible by service requestor clients. While information concerning a registered service provider client may also be viewable by the general public, i.e., a non-registered service requestor, such information is preferably limited to prevent a viewer from contacting the service provider outside of the system, e.g., contact information may be prevented from being displayed. Access to the on-line office can be made directly via the Command Center 20 and/or by the service provider client causing URLs relating to the service provider client to be redirected to their on-line office as maintained by the Command Center 20. Again, the on-line office preferably contains information that would be viewable by potential service requesters such that a potential service requestor can discern if a particular client service provider is appropriate for a given service need.

For requesting services, a client service requester may contact the system for the purpose of creating a work order 304. For example, this may be performed by a service requestor supplying information to the Command Center 20. In this regard, the Command Center 20 may be contacted via any means such as, for example, accessing the Command Center 20 Web site via a processing device (e.g., client computer 64) contacting Command Center 20 personnel via telephone, PDA, facsimile machine, e-mail, paging network, radio telephone, or the like. In these latter instances, the Command Center 20 personnel may be required to then manually enter the service request information into the Command Center 20 for the purpose of allowing the Command Center 20 to create a work order.

To direct work orders to intended recipients, the Command Center 20 may cause work orders to be transmitted to one or more of a technician computer 66, telephone, PDA, facsimile machine, e-mail account, pager, etc. of a client service provider 404. The recipient client service providers may then respond to the Command Center 20 to indicate a desire to answer the service request 406. Preferably, the client service provider that is first to respond to the Command Center 20 and which is qualified to perform work associated with the service request is awarded the service request contract. Providers are dispatched to perform the work 306. Prior to and/or after the assigning of a service request, a client service requestor may access the Command Center 20 to monitor all service logistics in real-time. For this purpose, any received service requests and/or work orders may be assigned a look-up number which would be transmitted to the service requestor. The service requestor may then indicate the look-up number to access status information maintained by the Command Center 20.

When the service request that is the subject of the work order is completed by the client service provider, information concerning the completed service request is provided by the client service provider to the Command Center 20 using any of the communication methodologies described previously 308. The Command Center 20 may then issue a notification to the client service requestor which notification would contain information relevant to the completion of the service request/work order 410. Again, the service request/work order completion notification may be issued to the client service requestor by being transmitted to one or more of a client computer 64, telephone, PDA, facsimile machine, e-mail account, pager, etc. of the client service requestor. Once the work order has been approved as completed by the service requestor, the Command Center 20 manages payment to the service provider as shown in steps 310 and 312.

In instances where the service provider is unable to complete the work order, for example, if a particular part must be replaced that needs to be specially ordered, the system may allow for the service provider to request that the work order be renegotiated with the service requestor for the purpose of addressing these additional needs. This negotiation may be done via message exchanges through the system or done directly between the parties. In either case, the system should be notified as to any changes or alterations to the work order so as to allow for the updating of the work order to ensure proper accounting. It is also contemplated that, in this case, the parties may agree that the work order is completed for purposes of accounting only and that the service requestor will issue a further service request for the purpose of having the work completed in actuality.

As discussed above, the present invention seeks to allow clients to make modifications to the presented work orders to refine them in response to questions from service providers, because of issues raised by the Command Center 20, or by their own volition. In the system described above, a percentage of work orders do not get accepted because work order descriptions are unclear or inadequate and need clarification. Buyers currently do not receive feedback from their routed providers about these work orders. Eventually, these work orders are voided or require significant intervention to get accepted.

According to the present invention, providers will be able to ask questions to the buyer before accepting a work order. The buyer can answer questions and thus provide clarification to the original work order details. With the added information, providers can make a more qualified decision to accept, reject or provide a conditional offer on a work order. The unacceptance rate of work orders decreases upon use of the present invention. Throughput in the work order acceptance pipeline also increases and reduces the amount of intervention needed to get work orders accepted. The present invention also helps to educate buyers on how to create more descriptive and effective work orders. This feature is useful and simple for buyers and providers, the potential for fraudulent activity is minimized, and questions and answers relate to work order clarification or conditional offers and not to spam.

With respect to user type permissions, only the creator of the work order receives email notifications of new questions. All buyer users who can manage a work order can see the clarification section and the answers. All other buyer users will not see the clarification section until the work order has been accepted. With respect to the service providers, only the provider user that was routed the work order will receive email notifications. All provider users who can accept/reject/conditional offer can see clarification section and post questions. All other provider users will not see the clarification section until the work order has been accepted.

Figure 5:
FIG. 5 illustrates a provider work order page, according to one embodiment of the present invention.

A provider work order page is illustrated in FIG. 5, illustrating this aspect of the invention. In the provider view work order page, for routed work orders (not accepted) a new section titled, "Clarification—Ask the Buyer a Question (Beta)" 1.2 is created and placed directly above the Accept, Reject or Provide Conditional Offer section. This section should always display a text entry box and a Post button next to it 1.5. Once a work order is accepted, the clarification section should appear (if there are clarification answers) below the work order description section. In preferred embodiments, the clarification section does not appear if there are no clarification answers.

In some embodiments, the text entry box 1.5 should be limited to 150 characters. This limitation number should be system configurable (not require a code change to modify). The Post button should be disabled whenever the text entry box is empty. It should be enabled otherwise. Once a provider enters text into the question box and clicks the Post button, a confirmation popup should confirm the posting.

In the provider view work order page, this new section should be dynamically updated as new questions and answers are posted by the provider viewing the page, and also by other routed providers. Posted questions should be publicly viewable only when the buyer answers them. (Unanswered questions are only viewable by the provider that posted the question). With this process, providers will likely ask redundant questions about a pressing issue if a buyer has not yet responded. This redundant line of questioning should emphasize to the buyer the importance of a particular issue.

In FIG. 5, Section 1.1 is a questions section and indicates whether no new answers or whether more than one new answer has been posted. Section 1.2 lists unaccepted work orders where the provider can pose a question seeking clarification. The number of questions remaining for this work order is also presented. If there are questions or clarification needed from the buyer about the work described on this work order, up to a predetermined number of questions may be asked. In one embodiment, this predetermined number is three. Once the buyer answers the question(s), or answers a clarification question posed by another routed provider, it will be displayed in that section. All questions and buyer answers are visible to all routed providers on this work order. All clarifications by the buyer are binding and are considered part of the requirements of this work order. Buyers are under no obligation to answer any question that is asked. Section 1.5 allows for a new question to be posed and Section 1.6 indicates whether a limit in the number of questions has been reached. Section 1.7 lists answered or unanswered questions posted by the provider viewing the page or another provider. Answers to the questions are also listed, if the questions have been answered.

Just below the section title, instructional text about the purpose and use of the section is provided. If the provider has previously asked a question that has not yet been answered, a subsection titled, "Your unanswered questions:" is displayed. In this subsection, all the provider's unanswered questions are displayed in a regular font. Multiple questions are separated by a line space. The background color for this subsection should not be affected, in most embodiments. On the top right corner of the text entry box, a remaining character counter is displayed, where the counter should start at the character limit. In preferred embodiments, the character limit is 150. As the user types in characters, the counter should decrement itself. When the counter hits 0 characters, the provider should not be able to type any new characters. This character limit should assist the providers in being more brief and concise in their questions.

On the right edge of the section title bar 1.2, a remaining question counter is displayed. Providers should be limited to a predetermined number of questions per work order. This limit number should be system configurable. This limit should create an incentive for providers to also be more brief and concise in their questioning and to avoid unnecessary spam. After a provider asks the maximum number of questions on the work order, the Post button, the text entry field, the text entry field title label, and the character counter are hidden. In its place, a notification message is displayed in an alternate font 1.6. Questions and their answers should be posted in reverse-chronological order below the text entry box. (most recent question posting should display on top of older postings), according to preferred embodiments. Question and answers may be grouped together in a single row and can be separated by a line space. The question may be in a bold font and answer may be in normal font. Both questions and answers can be suffixed with a time stamp in parenthesis. The time zone is also included in the time stamp. Finally, question and answer rows should have an alternating off-white background color, in preferred embodiments.

If a new answer is posted by the buyer while a provider is viewing the work order details page, a modal alert dialog is launched. The alert dialog must be closed in order to return to work order details page. The alert dialog should display the entire question and answer for the provider to read. The answer to the viewer's question or the buyer's answer to another's question can both be displayed. Once the provider clicks OK and the warning dialog closes, the question should appear in the Ask the Buyer a Question section 1.2.

At the top of the page under the work order title, a textual alert link is added upon initial page load when new buyer answers exist 1.1. All buyer answers are initially considered new (unread by the provider). After a provider loads the view work order page in a web browser, all answers posted on the page should no longer be considered new. This alert should link to the Ask the Buyer a Question section 1.2. This link should only include the number of new buyer answers. The link can appear in red font. A provider cannot post a new question after a work order has been accepted. If a provider attempts to post a question to a work order that has been accepted then he should be directed to the 'work order accepted by another provider error page'.

Figure 6:
FIG. 6 illustrates a buyer work order page, according to one embodiment of the present invention.

The buyer view work order page is illustrated in FIG. 6. The buyer's view work order page should similarly have a Questions & Answers section titled, "Answer Provider Questions (Beta)" 2.2. By default, this section should be hidden. When at least one question is posted by a provider, this section should appear just before the Custom Fields section (or the Description section if Custom Fields section does not exist). The buyer should know the identity of each provider that posts a question. The section should be dynamically updated as providers ask new questions and as the buyer answers questions. The clarification section should appear just above the work order description section.

Section 2.1, in FIG. 6, details the number of unanswered provider questions, if any. Section 2.2 lists unaccepted work order and provides those clarification questions in a listing in Section 2.3 and 2.4. Questions from routed providers can be answered to clarify the work described on this work order. All clarifications made are visible to all routed providers and are binding and considered part of the requirements for this work order. Section 2.4 lists unanswered provider questions, and specifies the provider, question and posting time for each. If the question has been answered, the answer, and its time of posting is also listed. An answer to a selected question can be provided in Section 2.5, with the Post button below.

The buyer's clarification section can be split into two subsections, unanswered questions and answered questions. The unanswered questions subsection can be displayed above the answered questions subsection. All unanswered questions in the unanswered questions subsection should be ordered by posting time, reverse-chronological order. A text entry box and Post button are displayed below any unanswered provider question (potentially more than one). The text entry box should be limited to a predetermined number of characters (system configurable). Only answers located in the text box above the clicked Post button should get posted when the button is pushed. During this event, text in other boxes should not get posted but should also not be cleared out. On the top right corner of each text entry box is a remaining character counter. The counter should start at the character limit. As the user types in characters, the counter should decrement itself. When the counter hits 0 characters, the provider should not be able to type any new characters. After the buyer clicks the post button and attempts to post an answer, a confirmation dialog should be presented to confirm the posting.

Once an answer is posted, the clarification section should be dynamically updated. The answered question should move from the unanswered questions subsection to the answered questions subsection. The answered questions subsection should display all pairs of questions and answers in rows with alternating off-white background color. These pairs should be ordered by the question posting date in reverse chronological order. Questions should appear in a bold font. Answers should appear in normal font and be separated from their matching questions by a single line space, in preferred embodiments.

Underneath the work order title, a textual alert is displayed whenever new unanswered questions from providers exist 2.1. The alert can be in a specific font or type and need not be linked. If there is also a conditional offer textual alert, the unanswered question alert can be displayed directly below the conditional offer alert. If a new question is posted by any provider while the buyer is viewing the work order details page, then a modal warning dialog is launched. The warning dialog should display the entire question for the buyer to read. Once the buyer clicks ok and the alert dialog closes, the question should appear at the top of the unanswered questions section. Once a work order is accepted, the question and answer section should no longer be editable. If a buyer posts an answer after the work order is accepted, then an error message should be displayed.

Whenever a question or answer is posted, contact information such as phone numbers and email addresses should be detected by the system and hidden. This process should help prevent fraudulent activity that might take place outside of the platform. This hidden information is not revealed, even after the work order is accepted, particularly because multiple providers might provide contact information that is not ultimately relevant to the buyer and accepting provider. An algorithm is in place for detecting phone numbers and email addresses in work order descriptions when the work order is in routed status. The same algorithm can be used to detect phone numbers and email addresses in posted questions and answers. Immediately after a buyer or provider posts and question or response, the content of the posting should be checked and stripped of any contact information. It is not necessary to store the detected contact information. Detected email addresses and telephone numbers should automatically be replaced with text indicative of the Command Center. The replaced text should be viewable by all parties (buyer, provider, admin) when the message is posted.

Immediately after a question or answer is posted, it is considered 'new'. That posting is no longer considered new once it has been loaded and displayed in the Q&A section of a particular user's work order details page. For routed providers, determination of the new status of a question/answer should be made on an individual basis. The same question and answer pair could be considered new (unread) for one provider and not new for another. For buyers, determination of the new status of an unanswered question should be made on a company basis. Once any user within a buyer company views a question in his work order details page, the question is no longer considered new for every user in that company. Additionally, once a question is answered by any user in a buyer company, it is no longer considered new.

Buyers should receive an email (primary and alternate email address) whenever a new question is posted to their work order. Buyers can post a response in two ways: reply to email with response written at the top of the reply and/or post a response in their Buyer Command Center—View Work Order page, Answer Provider Questions section. Only the creator of the work order should receive this email notification. This email recipient rule should be the same as the rule for conditional offer and work order notes notifications. If a buyer replies with an answer that is longer than a maximum number of characters or if the buyer replies after the work order has been accepted, then an error notification email is sent back to the buyer. Providers should similarly receive an email when an answer to their routed work order question is posted or when an answer to another provider's questions is posted. Providers should not receive email notifications on a work order when they reject a work order and check the box labeled, "Do not notify me again about this work order."

Figure 7:
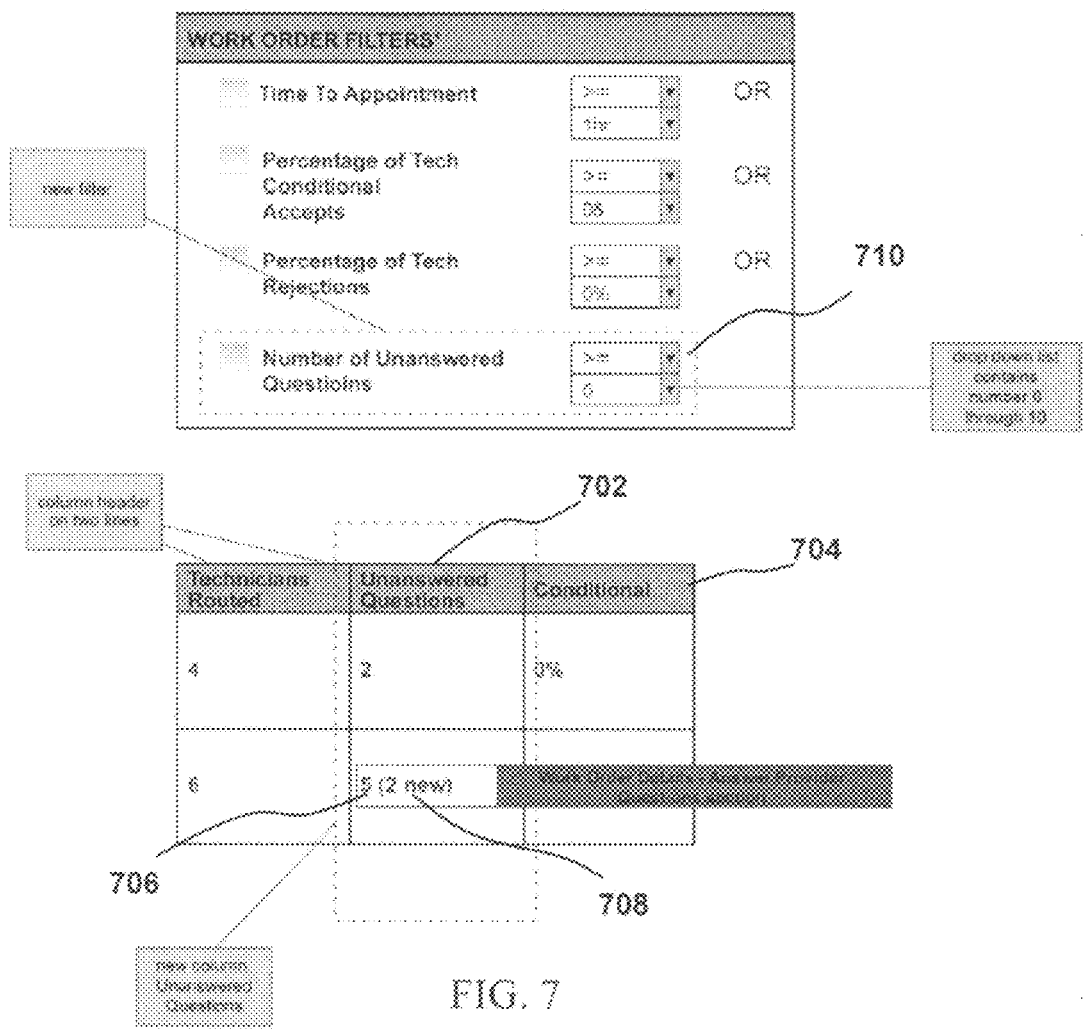
FIG. 7 illustrates screen-shot of a buyer unaccepted work order monitor, according to one embodiment of the present invention.

FIG. 7 illustrates the buyer's Unaccepted Work Order Monitor. In the buyer's Unaccepted Work Order Monitor, a new column titled "Unanswered Questions" 702 is created and is placed to the left of the Conditional column 704. This column should dynamically display the total number of unanswered questions that have been posted to a work order 706 and the number of new unanswered questions next to it in parenthesis 708. If at least one unanswered question exists for a work order, then the number should be a hyperlink that opens the View Work Order page with the Answer Provider Questions section scrolled to the top. This column should be sortable by total number of unanswered questions. The column should sort by descending order when its header is initially clicked. A new work order filter labeled, "Number of Unanswered Questions" 710 is created, where this filter should work similar to the existing filters. However, the buyer can filter <= or >= between 0 to 10 questions (absolute numbers, not percentages). The drop down list should contain the number 0 through 10. This filter should work in conjunction with the other existing filters, i.e. filters are OR'd together.

Figure 8:
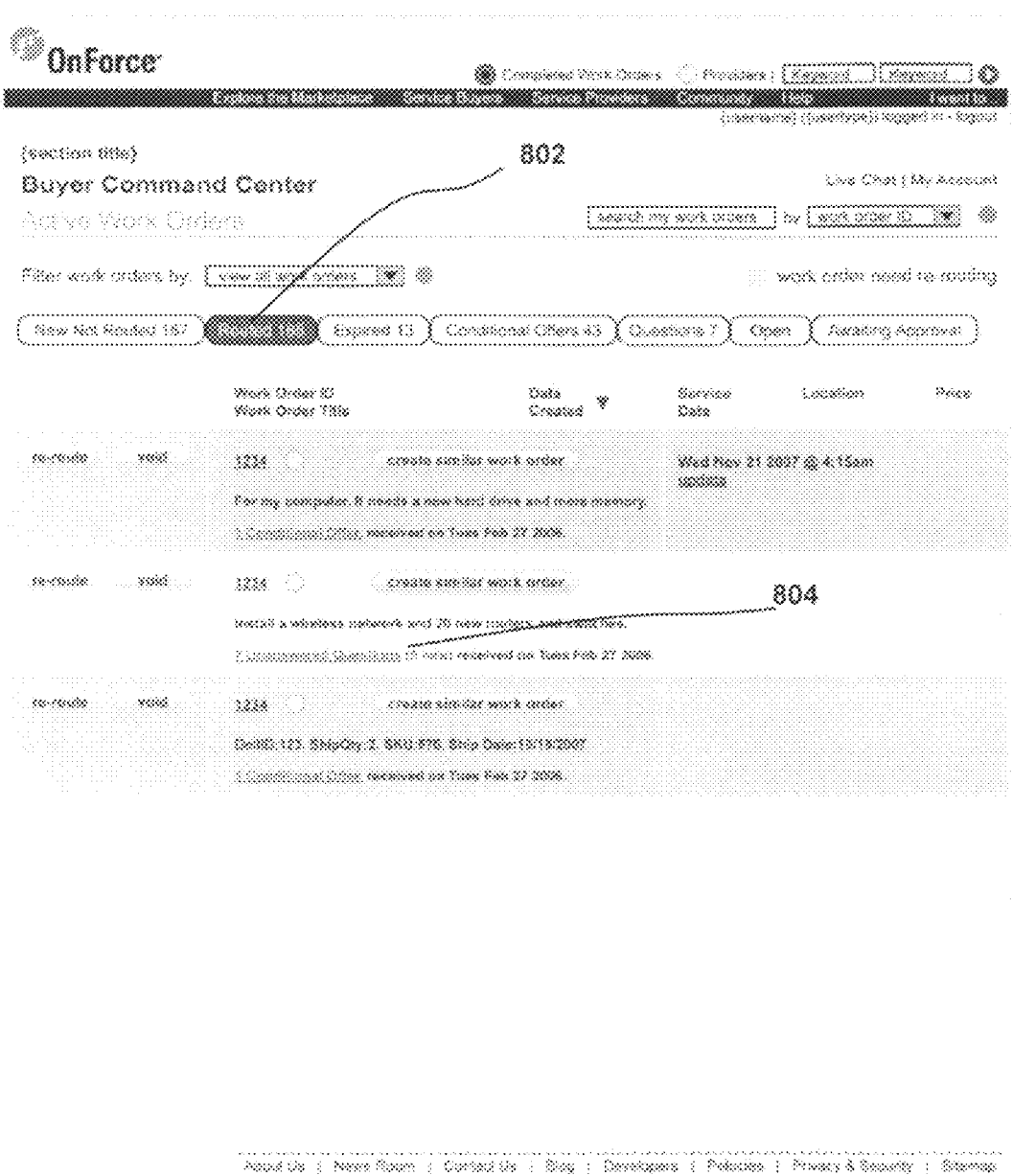
FIG. 8 illustrates screen-shot of a buyer command center routed status page, according to one embodiment of the present invention.

FIG. 8 illustrates a routed status display for the Buyer Command Center. In the routed work order tab 802 of the Active Work Orders page, a red font textual alert is displayed for unanswered questions 804. This alert should be displayed at the lower right hand corner of any relevant work order row, i.e. the alert should display below any conditional offer alert. The display provides the number of unanswered questions. The Provider Routed Work Orders Table is also illustrated in FIG. 9. In the Routed Work Orders table of the Online Office—Active Work Orders page, question & answer notification text is displayed in the first WO ID column 902. The text notification is displayed in an alternate font directly below the work order ID with the accompanying text, indicating the number of clarifications and whether they have been read by the user 904.

After work order acceptance, for both Buyers and Providers, the questions and answers section is modified. This section is only displayed in a work order page if at least one question and its answer was posted. Questions without answers should be stored but not be displayed. If the work order is ever moved back into routed status, unanswered questions should re-appear. The section is re-titled, "Questions and Answers," where the instructional text below the title is also changed. The section is no longer editable and only questions and answers and their time stamps are displayed (buyers still see provider identities). This section is placed directly above the description section for both buyers and providers. If the work order goes back to routed status (cancelled and needs to be re-routed), then the question and answer section is returned to its previous state. If a provider rejects a work order, and he checks the checkbox to no longer receive notifications, then he should not receive any email alerts when new questions and answers are posted to the work order.

Figure 10:
FIG. 10 illustrates screen-shot of an admin view work order page, according to one embodiment of the present invention.

The admin work order page is illustrated in FIG. 10. A buyer or provider might request to have a question or answer deleted for a number of reasons including: accidental postings or incorrect content, inappropriate content or abuse of system policies. To accommodate such requests, admins should have the ability to remove any questions and answers from any work order. This new section admin work order page displays all questions and answers posted by the providers and the buyer. It is formatted similarly to the Q&A section in the buyer's work order details page. For question and answer pairs, two buttons are provided below the answer to allow the admin to delete the answer or to delete both the answer and the question. An admin cannot delete a question without deleting the answer as well. For unanswered questions, a single button below the question is added to allow the admin to delete the question. After an admin clicks any of the delete buttons, a confirmation should popup with a question confirming the deletion.

When a provider accepts a work order, new answers might have been posted and not displayed to the provider due to the delay in the new question and answer alerts. Any question and answer pair that is not read by the provider prior to work order acceptance should be flagged in the system. These new questions and answers could effect the terms and conditions of the work order and influence the provider's ability or desire to complete the work order. Because this is an unlikely special case, the providers' acceptance process is not interrupted with any question and answer notifications. Instead, the provider is allowed to accept the work order as normal and immediately afterwards inform him of any new questions and answers. In the unlikely case that the provider no longer wishes to accept the work order because of the content of the new questions and answers, then he should unassign himself from the work order. In the Provider Work Order Accept page that is displayed immediately after a provider accepts a work order, the notification is modified. The modified text should contain a link to the Questions and Answer section.

The present invention gives buyers the ability to flag inappropriate questions which administrators can later remove or directly gives buyers the ability to remove questions that have not yet been answered. The danger in the latter alternative is that a provider could send contact information for dealings outside of the system. The buyer could then immediately erase the message once it is received. In either case, such functionality should not be implemented until quantitative feedback on this issue has been gathered.

The question and answer content is, in most embodiments, binding. All information that a buyer provides in his responses to provider questions should be binding. This includes answers to questions from the provider who eventually accepts the work order as well as from the providers who don't eventually accept the work order. Buyers should be made aware of this requirement and agree to it before posting an answer. Alternatively, question and answer content can be used as a free-form conditional offer section. Providers might make bids and request that the buyer change the spend limit. Since all providers will be able to publicly view any free-form conditional posted in the Q&A section, the provider who posts a free-form conditional offer will not have an unfair advantage over the other providers.

To reduce the potential for fraudulent activity, all postings should be publicly displayed. However, questions should not be displayed publicly until the buyer answers that question. This way, multiple providers will ask similar questions which will let buyers know of the importance of a particular issue. Buyers and providers should be made aware of the public display of their messages. This knowledge will hopefully deter providers and buyers from adding inappropriate content such as contact information or anything that might lead to fraudulent dealings outside of our platform.

Figure 11:
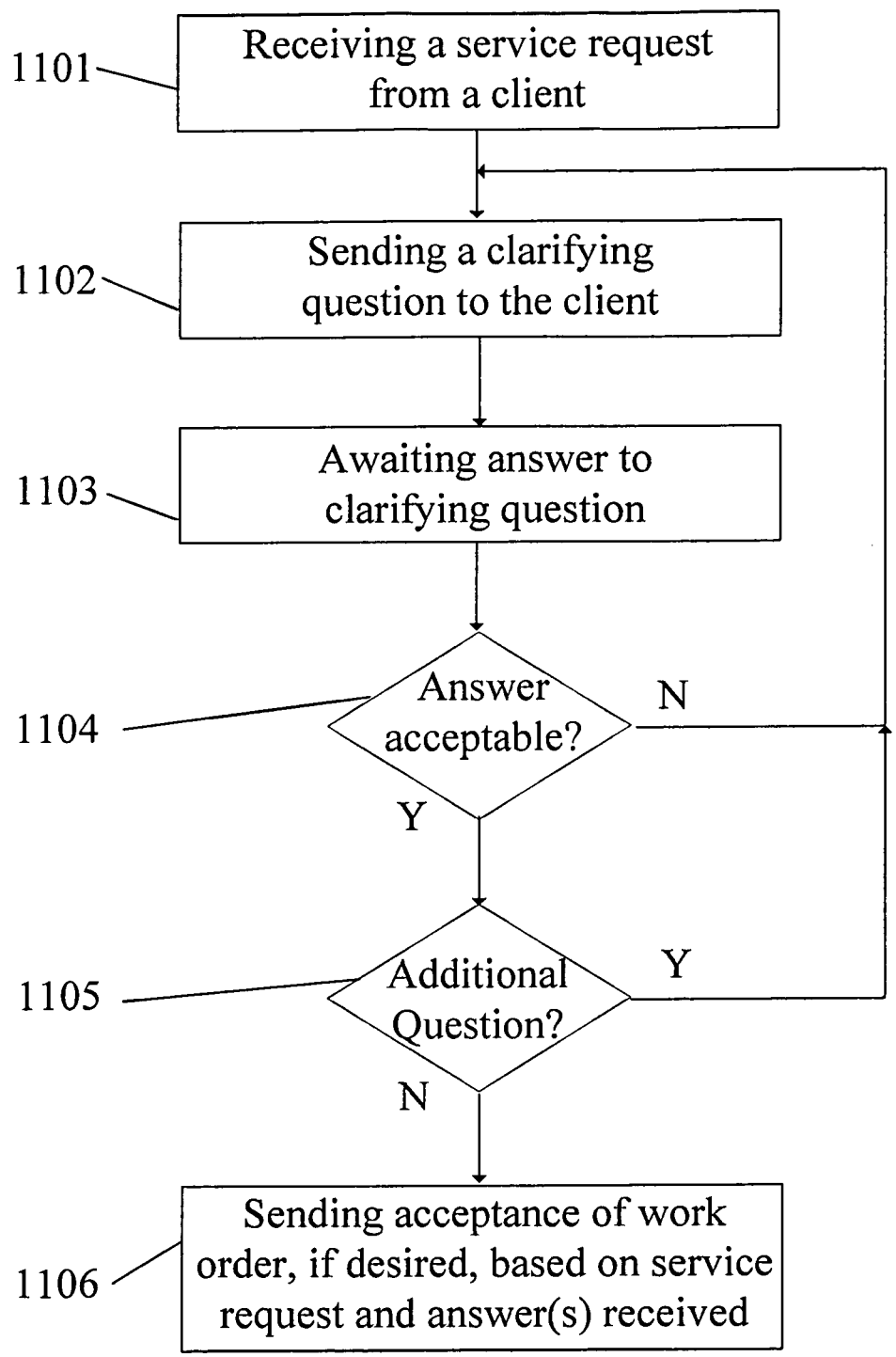
FIG. 11 illustrates a flow chart for the process of refining a work order before it has been accepted.

FIG. 11 provides a flow chart of the basic process of posing questions in response to a work order request. The request is received, step 1101, and the potential service provider poses a clarifying question to the client sending the work order request, step 1102, and awaits a response to the clarifying question, in step 1103. If the question is acceptable, flow continues in decision step 1104, and if not, another question is posed. If additional clarifying questions are needed, step 1105, they are posed, and it not, then acceptance of the work order is made, if desired, step 1106, based on the work order request and the responses to the clarifying question.

From the foregoing, it will be appreciated that the subject system and method has, among others, the advantages of: providing customers with a single point of contact, responsibility, and billing. It also has the advantage of providing a convenient means, e.g., the Internet, for accessing services. The subject system and method also has the advantage of providing service requesters with a generic catalog of services, possibly at substantially reduced prices. Still further, the subject system and method may allow access to certain providers of parts and/or providers of additional services that may be required. With respect to the service providers, the subject system and method has, among others, the advantage of providing for a steady flow of work (i.e., in the form of work orders) whereby service provider personnel will be able to better manage their daily schedules, receive payments and earn more consistent pay while providing faster response times to end users. Lastly, the present invention allows for service requests and service providers to have more interaction to increase the efficiency of the transactions and provide greater satisfaction with the overall process.

While a preferred embodiment of the invention has been set forth above, those skilled in the art who have reviewed the present disclosure will readily appreciate that other embodiments can be realized within the scope of the invention. Therefore, the present invention should be construed as limited only by the appended claims.

What is claimed is:

1. A method implemented on a computer the method comprising:
   receiving into said computer at least one request for a service from at least one requestor;
   creating in said computer at least one work order based at least in part on the at least one request;
   routing the at least one work order from said computer to at least one service provider;
   facilitating in said computer at least one question related to the at least one work order from said at least one service provider, said at least one question being accepted only if the service provider submitting the question has the power to accept, reject, or make a conditional offer on the at least one work order;
   forwarding the at least one question from said computer to the at least one requestor;
   receiving in said computer at least one response to the at least one question;
   routing the at least one response from said computer to the at least one service provider;
   displaying, using the computer, a clarification section in which the at least one question and the at least one response are displayed, said clarification section being visible by providers who have the power to accept, reject, or make a conditional offer on the at least one work order;
   monitoring for acceptance of the at least one work order by the at least one service provider, using said computer;
   notifying the at least one service provider of any changes to the clarification section that the at least one service provider did not read before accepting the at least one work order, wherein said notifying takes place after the at least one service provider accepted the at least one work order; and
   if there are any such changes to the clarification section, accepting into the computer an indication that the at least one service provider has unassigned itself from the at least one work order.

2. The method according to claim 1, wherein the at least one service provider is selected from a plurality of service providers.

3. The method according to claim 1, wherein the routing comprises routing the at least one response to a plurality of service providers.

4. The method according to claim 1, further comprising:
   comparing, in said computer, a number of the at least one question to a predetermined maximum number of questions; and
   preventing any additional questions when the number is equal to the predetermined maximum number of questions, using said computer.

5. The method according to claim 1, further comprising:
   determining, in said computer, a number of characters typed for the at least one question;
   comparing, in said computer, the number with a predetermined maximum number of characters; and
   preventing entry of additional characters into said computer when the number of characters equals the predetermined maximum number of characters.

6. The method according to claim 1, wherein the routing includes routing the at least one work order to the at least one service provider using at least one of a network connection, a facsimile machine, and a telephone.

7. The method according to claim 1, wherein the at least one service provider is selected based at least in part on at least one capability of the at least one service provider.

8. The method according to claim 1, further comprising:
   accepting feedback into said computer from the at least one requestor; and
   developing a rating for the at least one service provider based at least in part on the feedback, using said computer.

9. The method according to claim 1, further comprising:
   deleting from said computer the at least one question at the request of at least one of the requestor and the service provider;
   deleting from said computer the at least one response at the request of at least one of the requestor and the service provider.

10. A system for managing service requests, the system comprising:

a communication component for communicating with at least one requester and at least one service provider; and a processor, in communication with the communication component, the processor being configured for:

receiving at least one request for a service from said at least one requestor;

creating at least one work order based at least in part on the at least one request;

routing the at least one work order to said at least one service provider;

facilitating at least one question related to the at least one work order from said at least one service provider, said at least one question being accepted only if the service provider submitting the question has the power to accept, reject, or make a conditional offer on the at least one work order;

forwarding the at least one question to the at least one requestor;

receiving at least one response to the at least one question;

routing the at least one response to the at least one service provider;

displaying, using the computer, a clarification section in which the at least one question and the at least one response are displayed, said clarification section being visible by providers who have the power to accept, reject, or make a conditional offer on the at least one work order;

monitoring for acceptance of the at least one work order by the at least one service provider;

notifying the at least one service provider of any changes to the clarification section that the at least one service provider did not read before accepting the at least one work order, wherein said notifying takes place after the at least one service provider accepted the at least one work order; and if there are any such changes to the clarification section, accepting into the computer an indication that the at least one service provider has unassigned itself from the at least one work order.

11. The system according to claim 10, wherein the at least one service provider is selected from a plurality of service providers.

12. The system according to claim 10, wherein the processor is adapted to route the at least one response to a plurality of service providers.

13. The system according to claim 10, wherein the processor is further configured for:

comparing a number of the at least one question to a predetermined maximum number of questions; and preventing any additional questions when the number is equal to the predetermined maximum number of questions.

14. The system according to claim 10, wherein the processor is further configured for:

determining a number of characters typed for the at least one question;

comparing the number with a predetermined maximum number of characters; and preventing entry of additional characters when the number of characters equals the predetermined maximum number of characters.

15. The system according to claim 10, wherein the communication component comprises at least one of a network connection, a facsimile machine, and a telephone.

16. The system according to claim 10, wherein the at least one service provider is selected based at least in part on at least one capability of the at least one service provider.

17. The system according to claim 10, wherein the processor is further configured for:

accepting feedback from the at least one requestor; and developing a rating for the at least one service provider based at least in part on the feedback.

18. The system according to claim 10, wherein the processor is further configured for:

deleting the at least one question; and deleting the at least one response.

\* \* \* \* \*